US011573788B2

(12) United States Patent
Zoubeiri et al.

(10) Patent No.: US 11,573,788 B2
(45) Date of Patent: *Feb. 7, 2023

(54) CREATION AND EXECUTION OF CUSTOMIZED CODE FOR A DATA PROCESSING PLATFORM

(71) Applicant: Palantir Technologies Inc., Palo Alto, CA (US)

(72) Inventors: Shahine Zoubeiri, New York, NY (US); Javier Campanini, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/549,775

(22) Filed: Dec. 13, 2021

(65) Prior Publication Data

US 2022/0171617 A1    Jun. 2, 2022

Related U.S. Application Data

(63) Continuation of application No. 17/088,435, filed on Nov. 3, 2020, now Pat. No. 11,200,051, which is a
(Continued)

(30) Foreign Application Priority Data

Oct. 4, 2017   (GB) ..................... 1716173

(51) Int. Cl.
*G06F 9/44* (2018.01)
*G06F 8/71* (2018.01)
(Continued)

(52) U.S. Cl.
CPC ............. *G06F 8/71* (2013.01); *G06F 8/30* (2013.01); *G06F 9/468* (2013.01); *G06F 9/5027* (2013.01);
(Continued)

(58) Field of Classification Search
None
See application file for complete search history.

(56) References Cited

U.S. PATENT DOCUMENTS 9,262,300 B1    2/2016 Haba et al.
9,916,234 B1 *  3/2018 Norton ............... G06F 11/3672
(Continued)

FOREIGN PATENT DOCUMENTS

WO    WO2015/119659    8/2015

OTHER PUBLICATIONS

Official Communication for European Patent Application No. 18154117.8 dated Sep. 10, 2018.

*Primary Examiner* — Anna C Deng
(74) *Attorney, Agent, or Firm* — Hickman Becker Bingham Ledesma LLP

(57) ABSTRACT

A method of executing computer-readable code for interaction with one or more data resources on a data processing platform, the method performed using one or more processors, comprising: receiving a request message including an identifier identifying executable code stored in a data repository; determining, using the identifier, an execution environment of a plurality of stored execution environments mapped to the identified executable code, wherein determining the execution environment mapped to the identified executable code comprises: accessing mapping data identifying a mapping between the identifier and the execution environment of the plurality of stored execution environments, the mapping data including configuration data associated with the identifier, wherein the configuration data identifies one or more convention-based data libraries particular to the execution environment; configuring the determined execution environment to access the one or more convention-based data libraries during execution; executing the identified executable code using the determined execu-
(Continued)

tion environment; and passing requests made with the identified executable code to the one or more data resources via a proxy.

20 Claims, 9 Drawing Sheets

Related U.S. Application Data continuation of application No. 16/453,638, filed on Jun. 26, 2019, now Pat. No. 10,970,065, which is a continuation of application No. 15/884,068, filed on Jan. 30, 2018, now Pat. No. 10,409,590.

(51) Int. Cl.
G06F 9/46 (2006.01)
G06F 9/50 (2006.01)
H04L 67/56 (2022.01)
G06F 8/30 (2018.01)
G06F 11/36 (2006.01)
G06F 9/455 (2018.01)

(52) U.S. Cl.
CPC ........ *G06F 9/5072* (2013.01); *G06F 11/3664* (2013.01); *H04L 67/56* (2022.05); *G06F 2009/45587* (2013.01)

(56) References Cited

U.S. PATENT DOCUMENTS

| | | | |
|---|---|---|---|
| 2003/0061602 A1* | 3/2003 | Graham | G06F 8/52 717/148 |
| 2005/0223363 A1* | 10/2005 | Black-Ziegelbein | G06F 11/3624 717/127 |
| 2015/0170088 A1* | 6/2015 | Rizk | G06F 8/34 705/7.26 |
| 2015/0339104 A1* | 11/2015 | Frenkiel | G06F 11/3604 717/113 |
| 2016/0150053 A1 | 5/2016 | Janczuk et al. | |
| 2017/0244685 A1* | 8/2017 | Mirza | H04L 9/14 |
| 2017/0244686 A1 | 8/2017 | Haelion | |
| 2019/0102166 A1 | 4/2019 | Zoubeiri | |
| 2021/0072980 A1 | 3/2021 | Zoubeiri | |

\* cited by examiner

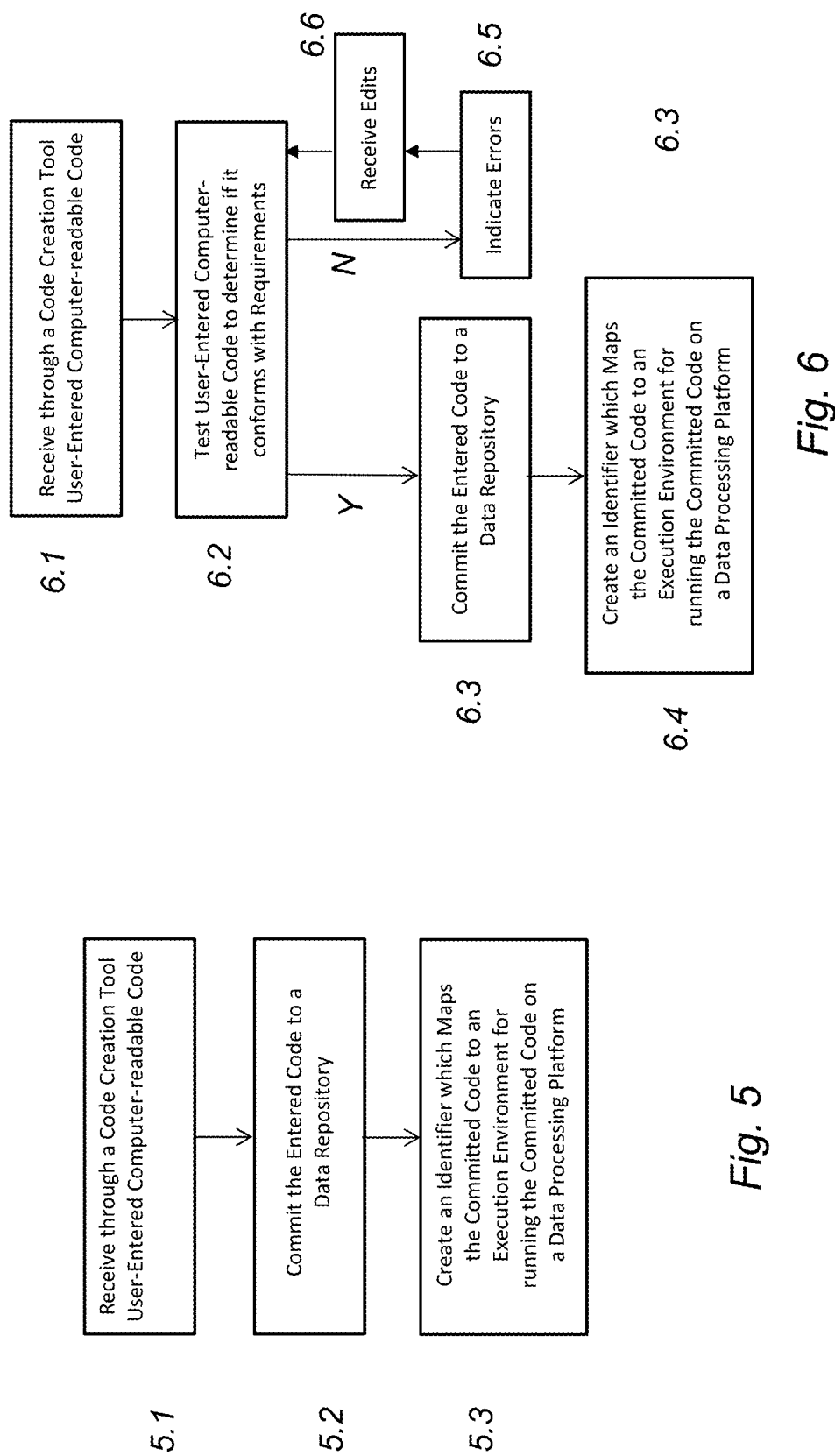

CREATION AND EXECUTION OF CUSTOMIZED CODE FOR A DATA PROCESSING PLATFORM

BENEFIT CLAIM

This application claims the benefit under 35 U.S.C. § 120 as a Continuation of application Ser. No. 17/088,435, filed Nov. 3, 2020, which claims the benefit under 35 U.S.C. § 120 as a Continuation of application Ser. No. 16/453,638, filed Jun. 26, 2019, now U.S. Pat. No. 10,970,065, issued Apr. 6, 2021, which claims the benefit under 35 U.S.C. § 120 as a Continuation of application Ser. No. 15/884,068, filed Jan. 30, 2018, now U.S. Pat. No. 10,409,590, issued Sep. 10, 2019, which claims the benefit under 35 U.S.C. § 119 of Great Britain application 1716173.8, filed Oct. 4, 2017, the entire contents of which are hereby incorporated by reference for all purposes as if fully set forth herein.

FIELD OF THE DISCLOSURE

The present disclosure relates to a method and systems for the creation of customised, computer-readable code for a data processing platform. The present disclosure also relates to the execution of customised, computer-readable code for a data processing platform. The customised, computer-readable code may be for interaction with one or more data resources stored on the data processing platform. The data processing platform may be, but is not limited to, an enterprise, cloud-based data processing platform for performing data analysis.

BACKGROUND

Cloud computing is a computing infrastructure for enabling ubiquitous access to shared pools of servers, storage, computer networks, applications, and other data resources, which can be rapidly provisioned, often over the Internet.

A data resource in this context is any form of executable software or data structure, usually but not exclusively for providing a service (and hence may be referred to as a data or software service) for example a data analysis application, a data transformation application, a report generating application, a machine learning process, a spreadsheet or a database.

Some companies provide cloud computing services for registered customers, for example manufacturing and technology companies, to create, store, manage and execute their own data resources. Sometimes, these data resources may interact with other software resources, for example those provided by the cloud platform provider.

For example, an engine manufacturer may create and store a database relating to spare parts for the different models of engines it produces and services. The database may, for example, be a multi-dimensional relational database. The engine manufacturer may also create one or more data analysis applications for performing certain tasks on data held in the database, for example to analyse and/or transform the data in order to identify trends which may be useful for predicting when certain parts will fail and/or need replacing, and hence when to produce and deploy the spare parts.

A platform provider may enable its registered customers to create their own customised code for storage and execution on their platform. Customised code is any user-created code for storage and execution on a third-party data processing platform.

The customised code may require interaction with other data resources on the platform. For example, an engine manufacturer may wish to create a new data resource for storage and execution on the data processing platform which passes a query to, and receives a result from, another data resource on the data processing platform. The other data resource may be associated with the engine manufacturer or a different organisation.

A problem with allowing users to create their own customised code is that the code may not conform to the platform's own technical requirements or protocols, for example in terms of data format and security policies. Consequently, the customised code may interfere with the normal operation of the data processing platform, slowing it down, and/or affecting other data resources and/or potentially corrupting other data resources on the data processing platform.

One way of permitting external users to create their own customised code is to for the platform provider to work alongside the external user, which has obvious practical limitations in terms of human resources and time. Another method is to provide users with a set of software guidance tools or documentation to assist them in creating code suitable for the platform, which tends not to be foolproof. When the customised code is prepared, the user usually needs to upload their code to a server of the platform in a separate operation or to send the code on a CD or DVD to the platform provider for uploading to the server at their end.

SUMMARY

A first aspect provides a method of executing computer-readable code for interaction with one or more data resources on a data processing platform, wherein the method is performed using one or more processors, comprising: receiving a request message including an identifier identifying executable code stored in a data repository; determining, using the identifier, an execution environment mapped to the executable code; executing the identified executable code using the determined execution environment; and passing requests made with the executable code to one or more data resources via a proxy.

The identifier may be an endpoint. The endpoint may be a universal resource locator (URL.)

The execution environment with which the identified executable code is executed may be isolated from the one or more data resources such that all requests made to, or received from, said data resources are made via the proxy.

The method may further comprise the proxy only passing requests made by the identified executable code to one or more data resources if said one or more data resources is pre-authorised.

Determining the execution environment mapped to the executable code may comprise accessing mapping data identifying a mapping between the identifier and one of a plurality of stored execution environments.

The mapping data may further comprise configuration data associated with the identifier, and wherein the method further may comprise configuring the determined execution environment based on the configuration data.

The configuration data may identify one or more convention-based data libraries particular to the executable code, and wherein the method may comprise configuring the determined execution environment to access the one or more convention-based data libraries during execution.

The executable code may be user-created computer-readable code entered through a code creation tool for storage on the data repository, the code creation tool being associated with the data processing platform.

The code creation tool may comprise an editor for receiving entered code and a debugging aid for indicating one or more of syntax errors, logical errors and runtime errors in the entered code for conformance with the data processing platform and/or the data resources with which the entered code will interact.

The debugging aid may cause indication of the errors simultaneously with the user-created code as it is entered.

The debugging aid may interact with an isolated test execution environment in order to identify runtime errors for indication.

The code creation tool may permit commitment of the entered code for storage on the data repository.

Commitment of code may only be permitted if the entered code conforms with the data processing platform and/or the data resources with which the code will interact.

The code creation tool may further temporarily store entered, but non-committed code, and wherein an isolated test execution environment may execute both the committed and non-committed code for displaying test output and/or indicating errors.

A second aspect provides a method of creating customised computer-readable code for interaction with one or more data resources on a data processing platform, wherein the method is performed using one or more processors, the method comprising: receiving, through a code creation tool, user-entered computer-readable code; committing the entered code to a data repository; creating an identifier which maps to the committed code and to an execution environment for running the committed code on the data processing platform.

The identifier may be an endpoint. The endpoint may be a URL.

The method may further comprise receiving the identifier from a proxy, and sending back to the proxy the mapped committed code and an indication of the execution environment for execution of the committed code at the proxy.

The code creation tool may comprise an editor for receiving entered code and a debugging aid for indicating one or more of syntax errors, logical errors and runtime errors in the entered code for conformance with the data processing platform and/or the external data resources with which the entered code will interact, the method further comprising testing the entered code using the debugging aid to indicate one or more of said errors.

The debugging aid may cause indication of the errors simultaneously with the user-created code as it is entered.

The debugging aid may interact with an isolated test execution environment in order to identify runtime errors for indication.

The code creation tool may permit commitment of the entered code for storage on the data repository.

Commitment of code may only be permitted if the entered code conforms with requirements of the data processing platform and/or the data resources with which the code will interact.

The code creation tool may further temporarily store entered, but non-committed code, and wherein an isolated test execution environment executes both the committed and non-committed code for displaying test output and/or indicating errors.

A third aspect provides a computer program, optionally stored on a non-transitory computer readable medium program which, when executed by one or more processors of a data processing apparatus, causes the data processing apparatus to carry out a method according to any previous method definition.

A fourth aspect provides an apparatus configured to carry out a method according to any previous method definition, the apparatus comprising one or more processors or special-purpose computing hardware.

BRIEF DESCRIPTION OF THE DRAWINGS

Example embodiments will now be described by way of non-limiting example with reference to the accompanying drawings, in which:

FIG. 5 is a flow diagram showing processing steps that may be performed by the code creation tool represented in FIG. 4 according to embodiments of this specification;

FIG. 6 is a flow diagram showing further processing steps that may be performed by the code creation tool represented in FIG. 4 according to embodiments of this specification;

DETAILED DESCRIPTION OF CERTAIN EMBODIMENTS

Figure 1:
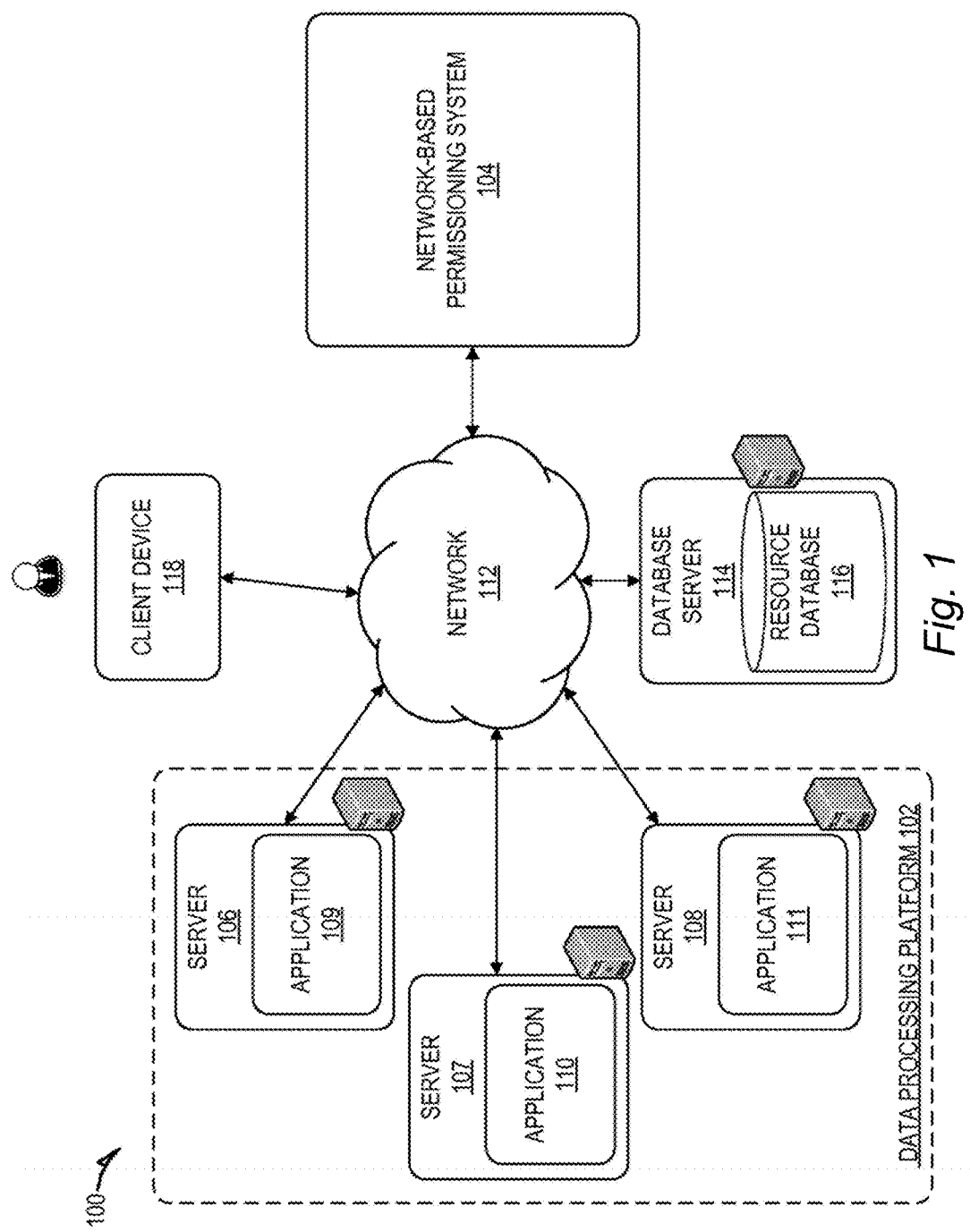
FIG. 1 is a block diagram illustrating a network system comprising a group of application servers of a data processing platform according to embodiments of this specification.

In brief, this specification describes methods and systems for the creation of customised, computer-readable code for a data processing platform. The present disclosure also relates to the execution of customised, computer-readable code for a data processing platform. The customised, computer-readable code may be for interaction with one or more data resources stored on the data processing platform. The data processing platform may be, but is not limited to, an enterprise, cloud-based data processing platform for performing data analysis.

The methods and systems may enable a platform provider to permit its registered customers to create their own customised code for storage and execution on the platform provider's platform.

Customised code is any user-created code for storage and execution on a third-party data processing platform.

The customised code may require interaction with other data resources on the platform. For example, an engine manufacturer may wish to create a new data resource for storage and execution on the data processing platform which passes a query to, and receives a result from, another data resource on the data processing platform. The other data resource may be associated with the engine manufacturer or a different organisation.

A problem with allowing users to create their own customised code is that the code may not conform to the platform's own technical requirements or protocols, for example in terms of data format and security policies. Consequently, the customised code may interfere with the normal operation of the data processing platform, slowing it down, and/or affecting other data resources and/or potentially corrupting other data resources on the data processing platform.

One way of permitting external users to create their own customised code is to for the platform provider to work alongside the external user, which has obvious practical limitations in terms of human resources and time. Another method is to provide users with a set of software guidance tools or documentation to assist them in creating code suitable for the platform, which tends not to be foolproof. When the customised code is prepared, the user usually needs to upload their code to a server of the platform in a separate operation or to send the code on a CD or DVD to the platform provider for uploading to the server at their end.

In terms of the creating customised computer-readable code for interaction with one or more data resources on the data processing platform, the method may involve receiving, through a code creation tool, user-entered computer-readable code. The method may also involve committing the entered code to a data repository, and creating an identifier which maps to the committed code to an execution environment for running the committed code on the data processing platform.

The identifier may be an endpoint, for example a Uniform Resource Locator (URL.)

In this way, user entered code in the data repository may be isolated from other data resources of the data processing platform such that the code, and the execution environment with which it is to be executed, can be identified simply by means of the identifier, e.g. a URL or other endpoint. For example, the program can be executed simply by passing the identifier to a control system which then retrieves the identified code and execution environment and executes the code accordingly for interaction with other data resources, for example via a proxy, ensuring that the code does not adversely affect or impact the other data resources.

The code creation tool may comprise an editor for receiving entered code and a debugging aid for indicating one or more of syntax errors, logical errors and runtime errors in the entered code for conformance with the data processing platform and/or the external services with which the entered code will interact. The code creation tool may test the entered code using the debugging aid to indicate one or more of said errors. The debugging aid may cause an indication of the errors simultaneously with the user-created code as it is entered. The debugging aid may interact with an isolated test execution environment in order to identify runtime errors for indication.

The code creation tool may permit commitment of the entered code for storage on the data repository, which may only be permitted if the entered code conforms with requirements of the data processing platform and/or the external services with which the code will interact.

The code creation tool may further temporarily store entered, but non-committed code, and an isolated test execution environment may execute both the committed and non-committed code for displaying test output and/or indicating errors.

In terms of executing the customised, computer-readable code, the methods and systems may involve receiving a request message including the identifier identifying executable code stored in a data repository. Using the identifier, an execution environment mapped to the executable code may be determined, and the identified executable code executed using the determined execution environment. Requests made by the executed code to one or more data resources on the processing system may be made via a proxy.

The identifier may be an endpoint, for example a URL.

The execution environment with which the identified executable code is executed may be isolated from the one or more external services such that all requests made to, or received from, an external service are made via the proxy. The proxy may only pass requests made by the identified executable code to one or more external services if said one or more external services is pre-authorised, i.e. stored on a whitelist which identifies authorised applications considered safe for interaction.

Mapping data may be used, identifying a mapping between the identifier and one of a plurality of stored execution environments. The mapping data may further comprise configuration data associated with the identifier, and wherein the method further comprises configuring the determined execution environment based on the configuration data. The configuration data may identify one or more convention-based data libraries particular to the executable code. The method may comprise configuring the determined execution environment to access the one or more convention-based data libraries during execution.

The code creation tool may be as defined previously, but is not limited to such an embodiment.

In the context of the following, the following definitions apply.

Customised code is any user-created code for storage and execution on a third party data processing platform.

A data processing platform is any computing platform on which executable code, or software, may be executed, providing particular functionality and restrictions, in that low-level functionality is provided which the executable code needs to conform to.

A data resource is any form of executable software, data set, or data structure usually, but not exclusively for providing a service, for example a data analysis application, a data transformation application, a report generating application, a machine learning process, a spreadsheet or a database.

A data repository is any form of data storage entity into which data is specifically partitioned or isolated.

An execution environment is any representation of an execution platform, such as an operating system or a database management system.

A proxy, or proxy server, is any form of computer system, application or combination which acts as an intermediary for requests between different computer systems, different servers, clients and servers, different applications, and different data resources. Proxies enable anonymity and/or isolation between different such resources.

A dataset is sometimes used interchangeably with data; a dataset holds data on the data processing platform, and usually has an accompanying schema for the dataset in order to make sense, or interpret, the data within the dataset.

The data processing platform may be an enterprise software platform associated with an enterprise platform provider. An enterprise software platform enables use by multiple users, internal and external to the enterprise platform provider. The users may be users of different respective organisations, such as different commercial companies.

The data resources stored on the software platform may relate to technical data and/or technical processes. For example, an engine manufacturer may create and store a database relating to spare parts for the different models of engines it produces and services. The database may, for example, be a multi-dimensional relational database. Certain analyses may be performed on the database using another application, for example an executable application resource for analysing and/or transforming the data in order to identify trends which may be useful for predicting when certain parts will fail and/or need replacing.

For this purpose, the software platform may comprise enterprise applications for machine-analysis of data resources. For example, an organisation may store on the software platform history data for a machine and use an enterprise application for the processing of history data for the machine in order to determine the probability, or a risk score, of the machine, or a component sub-system of the machine, experiencing a fault during a future interval. The enterprise application may use the fault probabilities or risk scores determined for a machine to select a preventative maintenance task which can reduce the probability and/or severity of the machine experiencing a fault.

History data for a machine may include sensor logs, a sensor log being multiple measurements of physical parameters captured by a sensor and relating to different points in time (a time series). History data for a machine may also include computer readable logs such as maintenance logs, fault logs and message logs corresponding to a machine. The maintenance log corresponding to the machine may record information such as dates and locations of prior maintenance tasks, details of replacement parts, free text notes made by an engineer or mechanic performing a maintenance task and so forth. The fault log corresponding to the machine may record information such as dates and locations of faults, the types of faults, the period of time required to rectify each fault and so forth. The message log corresponding to a machine, such as a ship or construction machinery, may record messages generated by controllers, processors or similar devices which are integrated into the component sub-systems of the machine. The messages may include a date and time, an identifier of a component sub-system, and message content such as, for example, warning information of information identifying a fault.

The above application is mentioned by way of example.

The data processing platform on which the data resources are stored and executed may be a proprietary or open source platform, which offers advantages in terms of time-to-deploy on the platform provider's hardware, as well as offering partitioning of data and rolling upgrades. An example open source platform is Kubernetes, which is particularly suited for automated deployment, scaling and management of applications. Such software platforms may employ containerised data resources.

In this regard, a containerised data resource comprises "containers" which hold one or more applications, and associated data libraries, that are guaranteed to be co-located on the same host machine and which can share resources.

Such software platforms may also provide a set of primitives which collectively provide mechanisms for deploying, maintaining, and scaling applications. A basic scheduling unit may be called a pod. A pod may consist of one or more containers.

FIG. 1 is a network diagram depicting a network system 100 comprising a data processing platform 102 in communication with a network-based permissioning system 104 (hereafter "permissioning system") configured for registering and evaluating access permissions for data resources to which a group of application servers 106-108 share common access, according to an example embodiment. Consistent with some embodiments, the network system 100 may employ a client-server architecture, though the present subject matter is, of course, not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

The data processing platform 102 includes a group of application servers, specifically, servers 106-108, which host network applications 109-111, respectively. The network applications 109-111 hosted by the data processing platform 102 may collectively compose an application suite that provides users of the network system 100 with a set of related, although independent, functionalities that are accessible by a common interface. For example, the network applications 109-111 may compose a suite of software application tools that can be used to analyse data to develop various insights about the data, and visualize various metrics associated with the data. To further this example, the network application 109 may be used to analyse data to develop particular metrics with respect to information included therein, while the network application 110 may be used to render graphical representations of such metrics. It shall be appreciated that although FIG. 1 illustrates the data processing platform 102 as including a particular number of servers, the subject matter disclosed herein is not limited to any particular number of servers and in other embodiments, fewer or additional servers and applications may be included.

The applications 109-111 may be associated with a first organisation. One or more other applications (not shown) may be associated with a second, different organisation. These other applications may be provided on one or more of the application servers 106, 107, 108 which need not be specific to a particular organisation. Where two or more applications are provided on a common server 106-108 (or host), they may be containerised which as mentioned above enables them to share common functions.

Each of the servers 106-108 may in communication with the network-based permissioning system 104 over a network 112 (e.g. the Internet or an intranet). Each of the servers 106-108 are further shown to be in communication with a database server 114 that facilitates access to a resource database 116 over the network 112, though in other embodiments, the servers 106-108 may access the resource database 116 directly, without the need for a separate database server 114. The resource database 116 may stores other data resources that may be used by any one of the applications 109-111 hosted by the data processing platform 102.

In other embodiments, one or more of the database server 114 and the network-based permissioning system 104 may be local to the data processing platform 102; that is, they may be stored in the same location or even on the same server or host as the network applications 109, 110, 111.

As shown, the network system 100 also includes a client device 118 in communication with the data processing platform 102 and the network-based permissioning system 104 over the network 106. The client device 118 communicates and exchanges data with the data processing platform 102.

The client device 118 may be any of a variety of types of devices that include at least a display, a processor, and communication capabilities that provide access to the network 106 (e.g., a smart phone, a tablet computer, a personal digital assistant (PDA), a personal navigation device (PND), a handheld computer, a desktop computer, a laptop or netbook, or a wearable computing device), and may be operated by a user (e.g., a person) to exchange data with other components of the network system 100 that pertains to various functions and aspects associated with the network system 100 and its users. The data exchanged between the client device 118 and the data processing platform 102 involve user-selected functions available through one or more user interfaces (UIs). The UIs may be specifically associated with a web client (e.g., a browser) or an application 109-111 executing on the client device 118 that is in communication with the data processing platform 102. For example, the network-based permissioning system 104 provides user interfaces to a user of the client device 118 (e.g., by communicating a set of computer-readable instructions to the client device 118 that cause the client device 118 to display the user interfaces) that allow the user to register policies associated with data resources stored in the resource database 116.

Figure 2:
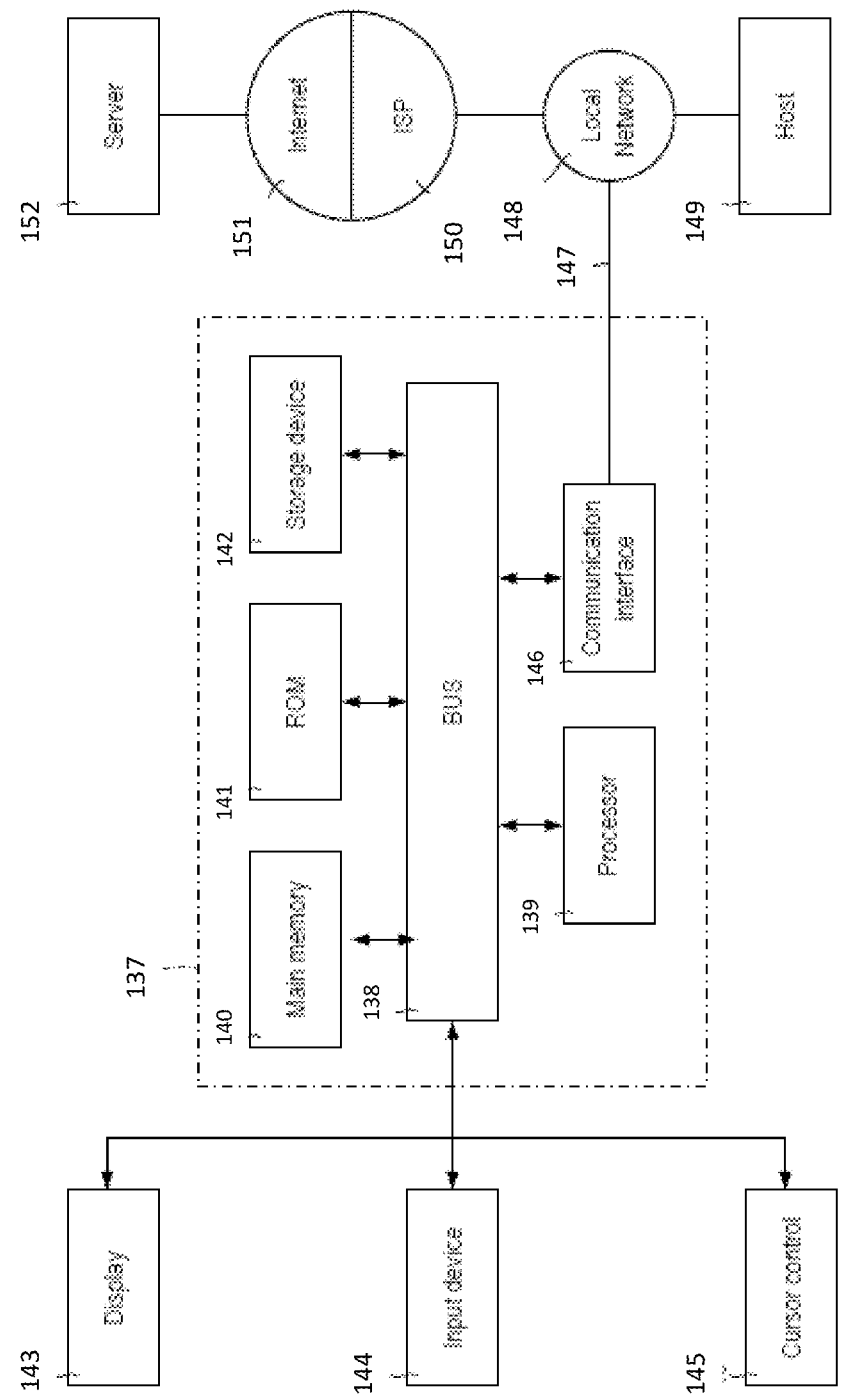
FIG. 2 is a block diagram of a computer system according to embodiments of this specification.

Referring to FIG. 2, a block diagram of an exemplary computer system 137, which may comprise the data processing platform 102, one or more of the servers 106-108, the database server 114 and/or the network-based permissioning system 104, consistent with examples of the present specification is shown.

Computer system 137 includes a bus 138 or other communication mechanism for communicating information, and a hardware processor 139 coupled with bus 138 for processing information. Hardware processor 139 can be, for example, a general purpose microprocessor. Hardware processor 139 comprises electrical circuitry.

Computer system 137 includes a main memory 140, such as a random access memory (RAM) or other dynamic storage device, which is coupled to the bus 138 for storing information and instructions to be executed by processor 139. The main memory 140 can also be used for storing temporary variables or other intermediate information during execution of instructions by the processor 139. Such instructions, when stored in non-transitory storage media accessible to the processor 139, render the computer system 137 into a special-purpose machine that is customized to perform the operations specified in the instructions.

Computer system 137 further includes a read only memory (ROM) 141 or other static storage device coupled to the bus 138 for storing static information and instructions for the processor 139. A storage device 142, such as a magnetic disk or optical disk, is provided and coupled to the bus 138 for storing information and instructions.

Computer system 137 can be coupled via the bus 138 to a display 143, such as a cathode ray tube (CRT), liquid crystal display, or touch screen, for displaying information to a user. An input device 144, including alphanumeric and other keys, is coupled to the bus 138 for communicating information and command selections to the processor 139. Another type of user input device is cursor control 145, for example using a mouse, a trackball, or cursor direction keys for communicating direction information and command selections to the processor 139 and for controlling cursor movement on the display 143. The input device typically has two degrees of freedom in two axes, a first axis (for example, x) and a second axis (for example, y), that allows the device to specify positions in a plane.

Computer system 137 can implement the techniques described herein using customized hard-wired logic, one or more ASICs or FPGAs, firmware and/or program logic which in combination with the computer system causes or programs computer system 137 to be a special-purpose machine. According to some embodiments, the operations, functionalities, and techniques disclosed herein are performed by computer system 137 in response to the processor 139 executing one or more sequences of one or more instructions contained in the main memory 140. Such instructions can be read into the main memory 40 from another storage medium, such as storage device 142. Execution of the sequences of instructions contained in main memory 140 causes the processor 139 to perform the process steps described herein. In alternative embodiments, hard-wired circuitry can be used in place of or in combination with software instructions.

The term "storage media" as used herein refers to any non-transitory media that stores data and/or instructions that cause a machine to operate in a specific fashion. Such storage media can comprise non-volatile media and/or volatile media. Non-volatile media includes, for example, optical or magnetic disks, such as storage device 142. Volatile media includes dynamic memory, such as main memory 140. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fibre optics, including the wires that comprise bus 138. Transmission media can also take the form of acoustic or light waves, such as those generated during radio-wave and infra-red data communications.

Various forms of media can be involved in carrying one or more sequences of one or more instructions to processor 139 for execution. For example, the instructions can initially be carried on a magnetic disk or solid state drive of a remote computer. The remote computer can load the instructions into its dynamic memory and send the instructions over a telephone line or other transmission medium using a modem. A modem local to computer system 137 can receive the data on the telephone line or other transmission medium and use an infra-red transmitter to convert the data to an infra-red signal. An infra-red detector can receive the data carried in the infra-red signal and appropriate circuitry can place the data on bus 138. Bus 138 carries the data to the main memory 140, from which the processor 139 retrieves and executes the instructions. The instructions received by the main memory 140 can optionally be stored on the storage device 142 either before or after execution by the processor 139.

Computer system 137 also includes a communication interface 146 coupled to the bus 138. The communication interface 146 provides a two-way data communication coupling to a network link 147 that is connected to a local network 148. For example, the communication interface 146 can be an integrated services digital network (ISDN) card, cable modem, satellite modem, or a modem to provide a data communication connection to a corresponding type of telephone line. As another example, the communication interface 146 can be a local area network (LAN) card to provide a data communication connection to a compatible LAN. Wireless links can also be implemented. In any such implementation, the communication interface 146 sends and receives electrical, electromagnetic, or optical signals that carry digital data streams representing various types of information.

The network link 147 typically provides data communication through one or more networks to other data devices. For example, the network link 147 can provide a connection through the local network 148 to a host computer 149 or to data equipment operated by an Internet Service Provider (ISP) 150. The ISP 150 in turn provides data communication services through the worldwide packet data communication network now commonly referred to as the "Internet" 151. The local network 148 and internet 151 both use electrical, electromagnetic, or optical signals that carry digital data streams. The signals through the various networks and the signals on the network link 147 and through the communication interface 146, which carry the digital data to and from the computer system 137, are example forms of transmission media.

The computer system 137 can send messages and receive data, including program code, through the network(s), network link 147 and communication interface 146. For example, a first application server 106 may transmit data through the local network 148 to a different application server 107, 108.

The data processing platform 102 may be a containerised data processing platform.

In this regard, a containerised data platform comprises "containers" which hold one or more applications, and associated data libraries, that are guaranteed to be co-located on the same host machine and which can share resources. Such software platforms may also provide a set of primitives which collectively provide mechanisms for deploying, maintaining, and scaling applications. A basic scheduling unit may be called a pod. A pod may consist of one or more containers.

Figure 3:
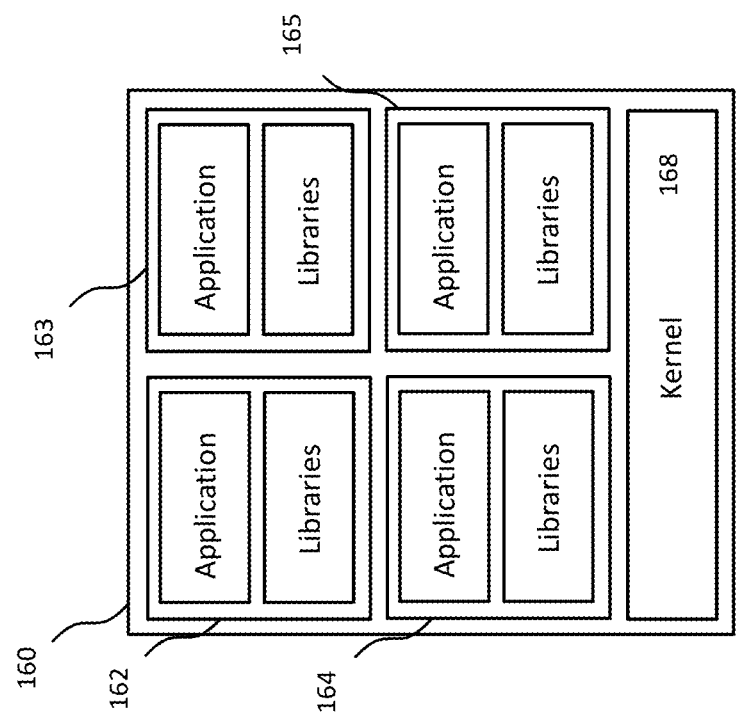
FIG. 3 is a schematic diagram of a container of a containerised computer platform according to embodiments of this specification.

For example, FIG. 3 is a schematic view of a container 160 of a containerised data processing platform. The container 160 in this case comprises first to fourth applications 162, 163, 164, 165, each having an associated library of functions, and a kernel 168. One or more of the first to fourth applications 162-165 may form part of a pod. For example, the first to third applications 162-164 may comprise a first pod and the fourth application 165 may comprise a second pod. For example, the first pod may comprise a first external organisation's applications, whereas the second pod may comprise a second external organisation's applications. Either way, the first and second pods run in the same kernel, in this example.

In accordance with an example embodiment, one of the application servers 106 in the data processing platform 102 shown in FIG. 1 comprises a customised software application 109 for enabling users, e.g. external customers, of the data processing platform to create their own executable code for interaction with one or more other data resources on the said platform.

Figure 4:
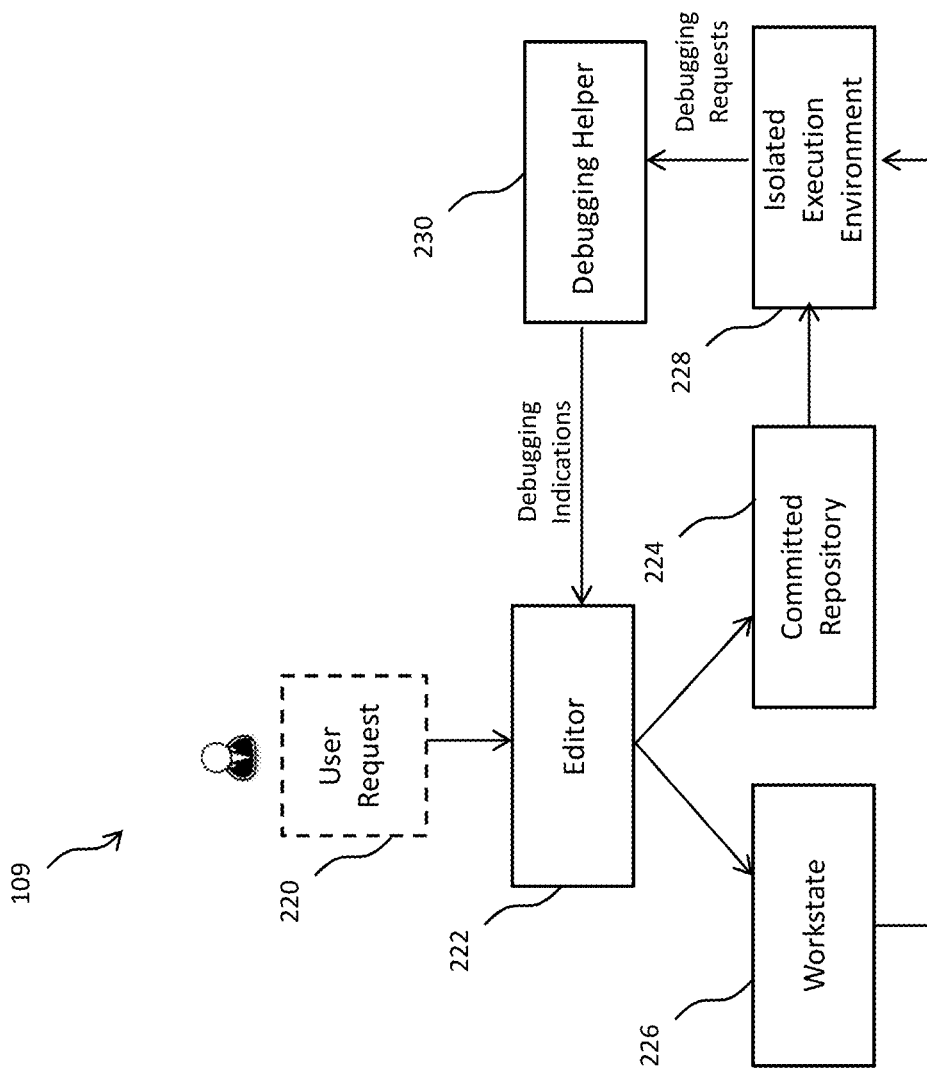
FIG. 4 is a block diagram of functional components of a code creation tool according to embodiments of this specification.

FIG. 4 shows functional elements of the customised software tool 109, which may be implemented in software, hardware, or a combination of both. The customised software tool 109 is an application which enables users to create executable code in a way that requires less monitoring or assistance from the provider of the data processing platform 102 and which permits users to identify their code by means of an identifier, e.g. an endpoint such as a URL, which maps to the appropriate execution environment and any further business logic appropriate to the created software.

The customised software tool 109 is responsive to user requests 220 to open a new file which the user may name accordingly upon opening.

The customised software tool 109 comprises an editor module 222, a committed repository 224, a workstate module 226, an isolated execution environment 228 and a debugging helper 230.

The editor module 222 may be any form of text editor for receiving alphanumeric text relating to code in any suitable programming language. The editor module 222 may comprise associated menus and functions, such as a create, edit, save, cut, copy, paste, commit.

The committed repository 224 is a dedicated storage module, isolated or partitioned from other data resources stored on the data processing platform 102, and which is specific to the customised software tool 109. The committed repository 224 stores code, which has been entered via the editor module 222, and which has been committed by the user through selection of the commit function provided with the editor module 222. The commit function of the editor module 222, when selected by the user, tells the customised software took 109 that the code is to be saved in the committed repository 224. Selection of the commit function also causes a mapping or correspondence to be created (if not already created) between an identifier of the user-entered code and a processing environment with which the code is to be executed. The mapping may also identify the user that created the code, for example to permit subsequent access to that code only by the same user or people authorised by the user, e.g. a group of users belonging to the same organisation. This may be determined using the network-based permissioning system 104 shown in FIG. 1.

The identifier may be an endpoint, such as a pathname or URL. For example, if the user creates a file called "helloworld" in a particular language for generating a "hello world" message, the identifier may be a path such as:

https://software.tool:123/api/helloworld.py in which "software.tool" references the server 106, "software.tool:123" references the customised software tool 109 and "software.tool/api/" references the service running on the path.

The processing environment with which the user-entered code "helloworld" is to be executed, as well as any other business logic, is identified or otherwise stored in the committed repository 224.

The processing environment and other business logic may be user-specified explicitly or implicitly. For example, an explicit method may comprise the author/user defining the processing environment in a configuration file, e.g., for a configuration file helloworld.yml, environment: python3. For example, an implicit method may comprise implicitly determining the processing environment using the file extension. In the above example, the .py extension would map to a Python-capable environment.

Thus, the code can subsequently be referenced for processing simply by the user entering the above identifier, as will be explained.

The workstate module 226 is another storage module, isolated or partitioned from other data resources stored on the data processing platform 102, and which is specific to the customised software tool 109. The workstate module 226 stores user-entered code as it is entered and deletes or archives said code when it is committed to the committed repository 224, or if the user closes the customised software tool 109. Thus, the workstate module 226 operates as a type of volatile storage system for uncommitted code as it is entered, although the memory itself need not be volatile memory. The workstate module 226 may be considered a form of auto save function, continually or periodically saving uncommitted code as it is entered.

The isolated execution environment 228 comprises an execution environment for executing, in isolation from the other data resources stored on the data processing platform 102, either or both of the user entered code stored on the committed repository 224 and the workstate module 226. The isolated execution environment may comprise a pool of pre-provided execution environments corresponding to each environment, allowing for requests to be serviced quickly if there is an existing and unused environment available. When an environment is used, it may be discarded and not used again. If the pool is empty, then each user request made via the endpoint (e.g., a URL) may incur the time cost of preparing an environment on top of the time it takes to run the code. A further optimization may include pre-provided execution environments with the code pre-fetched into them, further reducing the run time of the request. This may offer performance improvements.

The isolated execution environment 228 may operate in accordance to the conventions and requirements specified by the data processing platform 228 so as to generate, when executing the user entered code, outputs consistent with what would happen if said code was executed on outside of the isolated environment on the data processing platform 102. The isolated execution environment may operate in real-time or near real-time on code as it is entered, taking code associated with the same identifier from both the committed repository 224 and the workstate module 226.

The debugging helper 230 operates in association with the isolated execution environment 228. Particularly, the debugging helper 230 receives data from the isolated execution environment 228, such as standard outputs (e.g., stdout and stderr) as well as information such as files generated by executing the code. The debugging helper 230 then converts the information into user-friendly feedback that can be used for debugging purposes, which may be displayed in real-time or near real-time as the code is being entered. For example, consider a syntax error existing in the code. The code is run in the isolated execution environment 228 and the output stderr is passed to the debugging helper 230. The debugging helper 230 transforms the output to a message similar to "Syntax error on line 23 of file hello.world.py." The message is passed to the user via the user interface, such as a warning, a list of errors or indications in the code editor itself, e.g., highlighting the code.

The debugging helper 230 may provide its debugging indications within the editor module 222, e.g. to highlight code that does not comply with syntactical or logical requirements specified by the data processing platform 228, for easy reference and remedial action. For example, a line of code that is being entered which has a syntax error may be highlighted with an indication of the error displayed above, together with suggestions of one or more correct forms of the syntax, required or expected. The debugging helper 230 may be arranged such that user-selection of the one of the suggestions causes the corresponding code to be entered in place of the highlighted code.

Alternatively, a separate debugging user interface may be provided alongside, and displayed simultaneously with, the editor module 222, for displaying debugging indications.

Additionally, the debugging helper 230 may provide an output user interface which displays executed output of the code. The executed output may be displayed in real-time or near real-time as the code is being entered. The output user interface may therefore display runtime errors, for example, indicating that the entered code does not comply with the requirements of the data processing platform 228, and which parts are problematic, e.g. by specifying line numbers and the nature of the error. In some cases, one or more suggestions for remedial action may be provided or automatically invoked.

Additionally, the debugging helper 230 may provide an autocomplete or autofill function in relation to code as it is entered. For example, code comprising of a word or partial world may be recognised as corresponding to at least part of an instruction, definition, or logical statement. In such case, the debugging helper 230 may be configured to display an indication of one or more suggestions comprising the instruction, definition or logical statement that the user may wish to enter, the suggestions conforming to the correct forms of the syntax, required or expected. User-selection of one of the suggestions may cause the corresponding code to be entered in place of the entered code.

It follows that, after performance of debugging using the editor module 222 which runs in association with the debugging helper 230, edited code may again be committed by selecting the commit function, causing the code to be updated in the committed repository 224.

In some embodiments, code may only be committed in the committed repository 224 provided it satisfies the requirements specified by the data processing platform. Requirements may include, but are not limited to, one or more of code style checks, correctness checks and the code being able to compile.

In general summary, therefore, the customised software tool 109 provides a way for users to create new code, for example for creating new applications, which may or may not interact with data resources stored elsewhere on the data processing platform 228, in a more intuitive and helpful way in order that the code produced can meet certain requirements that may be imposed by the data processing platform 228. The requirements typically ensure that the created code will not adversely impact the data processing platform 228, or any other data resources on the data processing platform with which it may interact, or at least minimise the chances of this occurring. This functionality is achieved within a repository and execution environment that is isolated or partitioned from other data resources on the data processing platform.

Furthermore, the created code stored on the committed repository 224, as well as its associated processing environment, is associated with a unique identifier, such as an endpoint or URL. As will be explained below, this permits the code to be passed for interaction with the data processing platform 228 merely by submitting the identifier rather than uploading or transferring the code to the data processing platform 228 itself. The provided functionality may be referred to as serverless' as the created code does not need to reside on the server of the other data resources with which it will interact.

FIG. 5 is a flow diagram showing processing operations that may be performed by the customised software tool 109 when implemented on a processor 139 shown in FIG. 2. The processing operations may represent program instructions stored on one or more of the ROM 141, main memory 140 or ROM 141 of, in this example, the server 106 of the data processing platform 102. In the foregoing, the numbering of the processing operations is not necessarily indicative of the required order to operations, and re-ordering may be employed. Not every operation may be required in some situations.

A first operation 5.1 comprises receiving, through a code creation tool, user-entered computer-readable code.

A second operation 5.2 comprises committing the entered code to a data repository.

A third operation 5.3 comprises creating an identifier which maps the committed code to an execution environment for running the committed code on a data processing platform. Other features may include the tight integration of the customised software tool 109 to the rest of the system, including the provision of buttons and menues to help operate the tool, and the integration of the above debugging helper 230.

FIG. 6 is a flow diagram showing, in a further embodiment, processing operations that may be performed by the customised software tool 109 when implemented on a processor 139 shown in FIG. 2. The processing operations may represent program instructions stored on one or more of the ROM 141, main memory 140 or ROM 141 of, in this example, the server 106 of the data processing platform 102. In the foregoing, the numbering of the processing operations is not necessarily indicative of the required order to operations, and re-ordering may be employed. Not every operation may be required in some situations.

A first operation 6.1 comprises receiving, through a code creation tool, user-entered computer-readable code.

A second operation 6.2 comprises testing the user-entered computer-readable code to determine if it conforms with requirements of the data processing platform and/or one or more data resources with which it will interact.

A third operation 6.3 comprises, if the code does conform, committing the entered code to a data repository.

A fourth operation 6.4 comprises creating an identifier which maps the committed code to an execution environment for running the committed code on a data processing platform.

A fifth operation 6.5 comprises, if the code does not conform in the operation 6.2, indicating errors to the user.

A sixth operation 6.6 comprises, receiving edits based on the indicated errors. The process may then return to the second operation 6.2.

Figure 7:
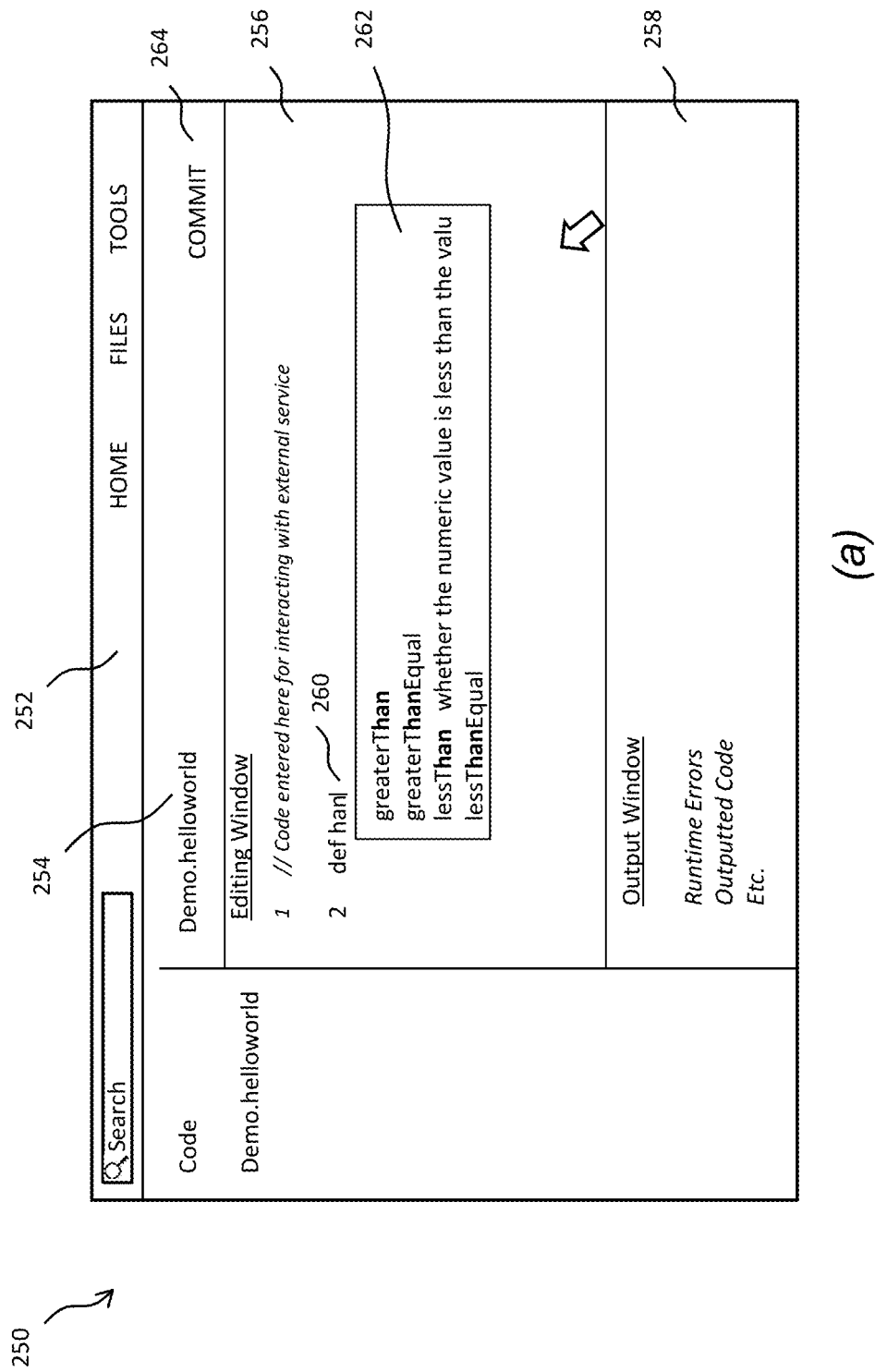
FIG. 7a and FIG. 7b are example user interface screenshots representing different operating stages of the code creation tool according to embodiments of this specification.
Figure 7:
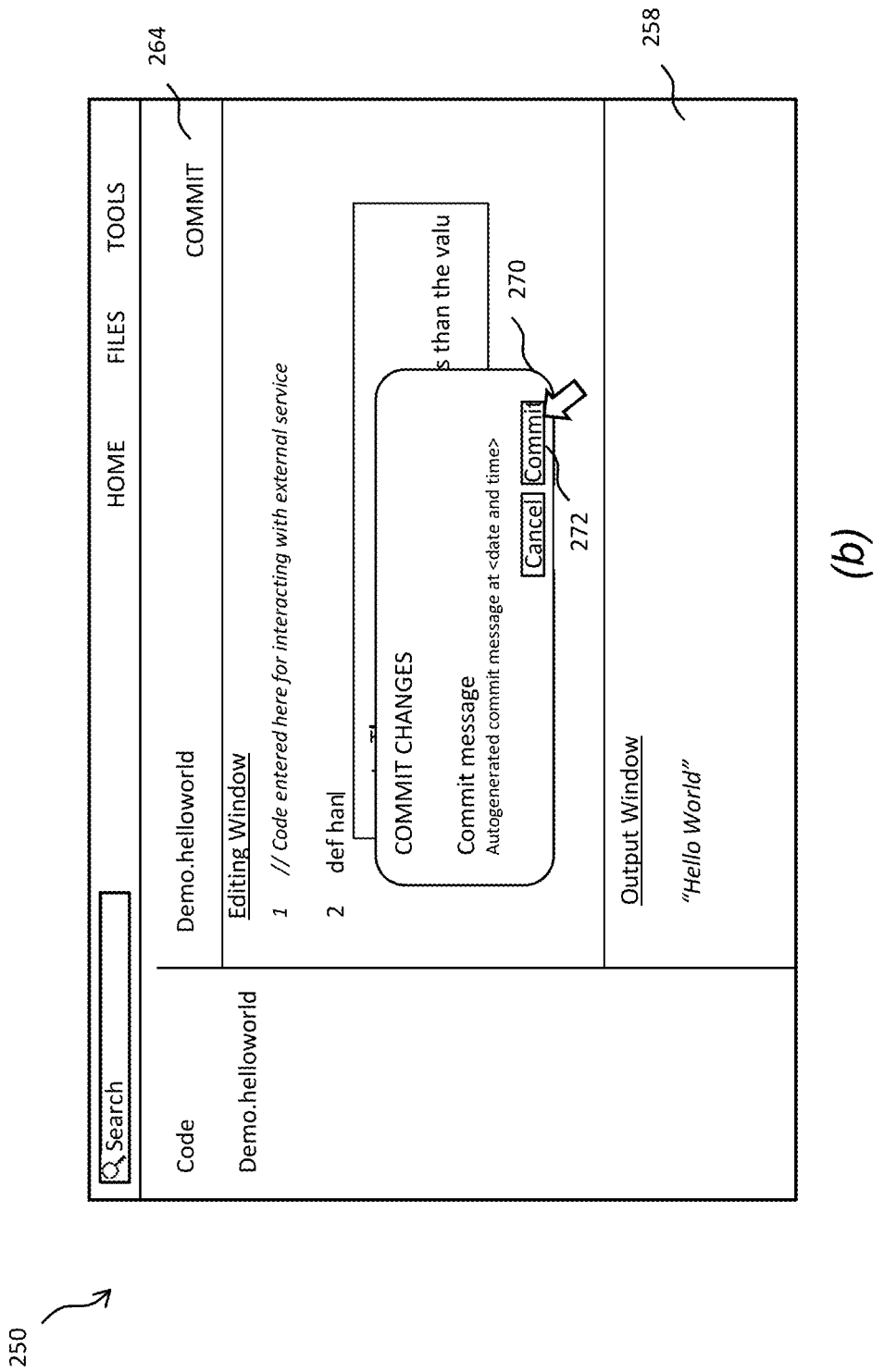

FIG. 7a shows an example user interface 250 associated with the customised software tool 109 described above. The user interface 250 may comprise an upper toolbar 252 which is a standard toolbar permitting users to access different functional items of a file system associated with the data processing platform 102. For example, a user may access the "files" functional item and select from a series of pulldown options a "create new" option. Responsive to this, the user may specify a file name 254 for storage in a selected directory for the user. A new editor window 256 may be simultaneously displayed for receiving user entered code in the form of alphanumeric characters. In the shown example, an output window 258 is displayed simultaneously with the editor window 256. The output window 258, as explained previously, permits runtime errors to be indicated in real-time or near real-time as code is entered, based on what happens on the isolated execution environment.

An example line of code 260 is shown partially entered in the editor window 256. As previously indicated, errors or autofill suggestions 262 may be shown overlaid with code as it is entered in the editor window 256. In this case, entry of the text "han" causes the automatic prompting of the suggestions 262 which include this string of letters. Selection of one of said suggestions 262, e.g. "greaterThan" may cause this string to replace the original string. Similarly, if an error of syntax or logic is detected, the error and/or one or more correct replacements may be suggested in a similar manner.

A "commit" option 264 is displayed as part of the user interface 250, selection of which causes the entered code to be committed to the committed repository 224 shown in FIG. 4. Prior to this, entered code is autosaved in the workstate 226 module. Responsive to selection of the "commit" option 264, the customised software tool 109 may highlight critical errors that the code may still contain which would prevent its interaction with data resources stored on the data processing platform 102. Alternatively, the customised software tool 109 may prevent commitment until such code does conform with at least a minimal set of requirements of the data processing platform 102.

For example, FIG. 7b shows the example user interface 250 subsequent to selection of the "commit" option 264. Responsive to said selection, a further window 270 may appear, enabling tailoring of a commit message which may indicate the date and time of the commitment. Selection of a further "commit" option 272 will cause commitment of the code to the committed repository 224. Additionally, the output window 258 may display the generated output prior to selection of the further "commit" option 272.

In accordance with another embodiment, the application server 106, or a different application server, in the data processing platform 102 may comprise a code execution application 300 for enabling users, e.g. external customers, of the data processing platform to execute their customised executable code for interaction with one or more other data resources on the said platform. For example, the customised executable code may be generated using the customised software tool 109, described above with reference to FIGS. 4 to 7.

The code execution application 300 may form part of the same application as the customised software tool 109, or it may be a separate application.

Figure 8:
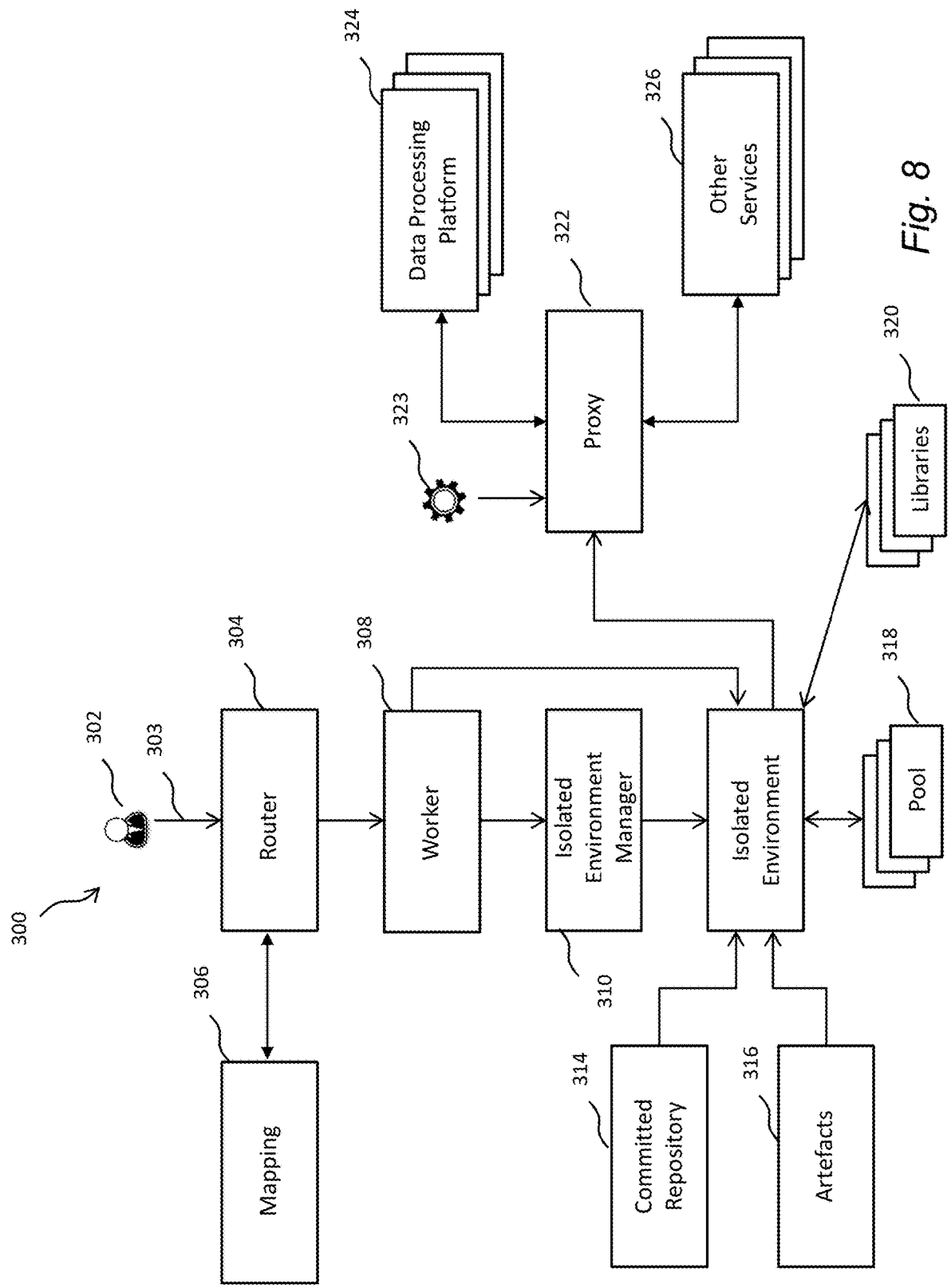
FIG. 8 is a schematic diagram of functional components of a code execution tool according to embodiments of this specification.

FIG. 8 shows functional elements of the code execution application 300. The code execution application 300 is an application which allows users to run their code merely by entering the above-described identifier, e.g. the endpoint or URL, into a user interface.

Responsive to specifying the identifier, the code execution application 300 is configured to collect the identified code from the committed repository 224, as well as the mapped processing environment, and any other specified business logic, in order to execute that code in isolation from other data resources on the data processing platform 102. That is, any requests made to said other data resources, or received therefrom, is made via a proxy which further ensures that the code will not adversely affect said other data resources. This provides a further way by which customised code can be executed in a secure and safe way.

The code execution application 300 comprises a router 304, a mapping module 306, a worker module 308, an isolated environment manager module 310, an isolated execution environment 312, a committed repository 314, which may be the same as the committed repository 224 shown in FIG. 4, one or more artefacts 316, a pool of execution environments, one or more software libraries 320 and a proxy 322.

The various modules shown in FIG. 8 may be combined into a smaller number, or a single module in some circumstances.

The router 304 receives requests 303 from one or more users 302. The request 303 may simply comprise the identifier, e.g. a URL. The router 304 is configured to map the identifier, using the mapping 306, to the customised code and execution environment needed to run the code. The router 304 then sends the mapping to the worker 308.

The worker 308 communicates with the isolated environment manager 310 to check that the required execution environment is available from the pool of execution environments 318. The isolated environment manager 310 is a virtualised environment controller, which provides, manages and/or co-ordinates the isolated environment(s). The pool of execution environments 318 stores a plurality of different execution environments from which the worker 308 can select one suitable or appropriate to the customised code. Each execution environment in the pool 318 is configured to conform with the data processing platform 102.

If the required execution environment is available in the pool of execution environments 318, the worker 308 then prepares the required execution environment to be the selected execution environment 312. The selected execution environment 312 receives the identified code from the committed repository 314, as well as any artefacts 316 required, as well as any data libraries 320 required.

The worker 308 then makes another request to execute the identified code on the selected and prepared executable environment 312.

If at any time the executed code requests data from other data resources on the data processing platform 324, or indeed if requests are received from said other data resources to the executed code, such requests are made via the proxy 322. The proxy 322 is configured to translate over the security layer and may receive configuration data 323. The configuration data may come from the code created by the author, as well as data that's controlled by the maintainer of the service, e.g. the administrator. The configuration data allows users to define what services it wants access to, as well as permissions it may require. For example, the user may want access to www.example123.com to fetch the homepage, or access to make a WRITE request to another service. Examples of sources of this data may come from the administrator of the service, or a file within the code repository, similar to the helloworld.yml example given above.

Figure 9:
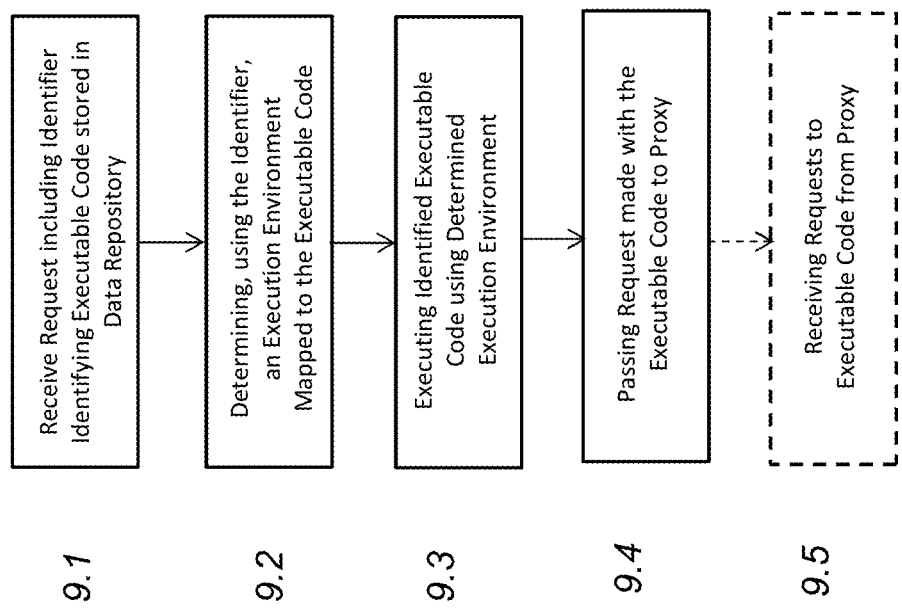
FIG. 9 is a flow diagram showing processing steps that may be performed as part of the FIG. 8 code creation tool according to embodiments of this specification.

FIG. 9 is a flow diagram showing, in a further embodiment, processing operations that may be performed by the code execution application 300 when implemented on a processor 139 shown in FIG. 2. The processing operations may represent program instructions stored on one or more of the ROM 141, main memory 140 or ROM 141 of, in this example, the server 106 of the data processing platform 102. In the foregoing, the numbering of the processing operations is not necessarily indicative of the required order to operations, and re-ordering may be employed. Not every operation may be required in some situations.

A first operation 9.1 comprises receiving a request including an identifier identifying executable code stored in the data repository.

A second operation 9.2 comprises determining, using the identifier, an execution environment mapped to the executable code.

A third operation 9.3 comprises executing the identified executable code using the determined execution environment.

A fourth operation 9.4 comprises passing requests made with the executable code to the proxy.

A fifth, optional, operation 9.5 comprises receiving requests to the executable code from the proxy. In some embodiments, the code execution application 300 may make further requests to other services as the user makes the initial request. For example, if a user makes a call to helloworld.yml, that code may fetch data to see what the user has access to, and return the processed results. Also, it can scope down access that proxied requests have, assuming the use of a permissioning system. For example, a user may wish to ensure that proxied requests will be performed as the original requesting user, but with less permissions, such as only permitting READ access and not WRITE access.

The following numbered clauses, which are not intended as claims, form a part of this disclosure:

1. A method of executing computer-readable code for interaction with one or more data resources on a data processing platform, the method performed using one or more processors, comprising: receiving a request message including an identifier identifying executable code stored in a data repository; determining, using the identifier, an execution environment mapped to the executable code; executing the identified executable code using the determined execution environment; passing requests made with the executable code to one or more data resources via a proxy; wherein the identifier is an endpoint and/or wherein the endpoint is a universal resource locator (URL.)

2. A method as previously stated, the debugging aid causing indication of the errors simultaneously with the user-created code as it is entered.

3. A method of creating customised computer-readable code for interaction with one or more data resources on a data processing platform, wherein the method is performed using one or more processors, the method comprising: receiving, through a code creation tool, user-entered computer-readable code; committing the entered code to a data repository; creating an identifier which maps to the committed code and to an execution environment for running the committed code on the data processing platform.

4. The method of clause 3, wherein the identifier is an endpoint.

5. The method of clause 4, wherein the endpoint is a URL.

6. The method of clause 3, further comprising receiving the identifier from a proxy, and sending back to the proxy the mapped committed code and an indication of the execution environment for execution of the committed code at the proxy.

7. The method of clause 3, wherein the code creation tool comprises an editor for receiving entered code and a debugging aid for indicating one or more of syntax errors, logical errors and runtime errors in the entered code for conformance with the data processing platform and/or the external data resources with which the entered code will interact, the method further comprising testing the entered code using the debugging aid to indicate one or more of said errors.

8. The method of clause 7, wherein the debugging aid causes indication of the errors simultaneously with the user-created code as it is entered.

9. The method of clause 7, wherein the debugging aid interacts with an isolated test execution environment in order to identify runtime errors for indication.

10. The method of clause 7, wherein the code creation tool permits commitment of the entered code for storage on the data repository.

11. The method of clause 10, wherein commitment of code is only permitted if the entered code conforms with requirements of the data processing platform and/or the data resources with which the code will interact.

12. The method of clause 10, wherein the code creation tool further temporarily stores entered, but non-committed code, and wherein an isolated test execution environment executes both the committed and non-committed code for displaying test output and/or indicating errors.

13. One or more computer-readable non-transitory data storage media storing one or more sequences of program instructions which, when executed by one or more processors of a data processing apparatus, causes the data processing apparatus to perform a method of interaction with one or more data resources on a data processing platform, the method comprising: receiving, through a code creation tool, user-entered computer-readable code; committing the entered code to a data repository; creating an identifier which maps to the committed code and to an execution environment for running the committed code on the data processing platform.

14. The non-transitory data storage media of clause 13, wherein the identifier is a URL.

15. The non-transitory data storage media of clause 13, further comprising instructions which when executed cause receiving the identifier from a proxy, and sending back to the proxy the mapped committed code and an indication of the execution environment for execution of the committed code at the proxy.

16. The non-transitory data storage media of clause 13, wherein the code creation tool comprises an editor for receiving entered code and a debugging aid for indicating one or more of syntax errors, logical errors and runtime errors in the entered code for conformance with the data processing platform and/or the external data resources with which the entered code will interact, the media further comprising instructions which when executed cause testing the entered code using the debugging aid to indicate one or more of said errors.

17. The non-transitory data storage media of clause 16, wherein the debugging aid causes indication of the errors simultaneously with the user-created code as it is entered.

18. The non-transitory data storage media of clause 16, wherein the debugging aid interacts with an isolated test execution environment in order to identify runtime errors for indication.

19. The non-transitory data storage media of clause 16, wherein the code creation tool permits commitment of the entered code for storage on the data repository.

20. The non-transitory data storage media of clause 19, wherein commitment of code is only permitted if the entered code conforms with requirements of the data processing platform and/or the data resources with which the code will interact.

21. The non-transitory data storage media of clause 19, wherein the code creation tool further temporarily stores entered, but non-committed code, and wherein an isolated test execution environment executes both the committed and non-committed code for displaying test output and/or indicating errors.

Although claims have been formulated in this application, as recited in the next section, to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicant hereby gives notice that new claims may be formulated to such features and/or combinations of such features during the prosecution of the present application or of any further application derived therefrom.

What is claimed is:

1. A method of creating and executing computer-readable code for interaction with one or more data resources on a data processing platform, the method performed using one or more processors, comprising:
   committing user-entered computer-readable code to a data repository that is isolated from other data resources on the data processing platform, the committed code conforming to at least a minimal set of requirements of the data processing platform;
   in response to committing the user-entered computer-readable code, creating an identifier mapping the committed code to an execution environment that is isolated from the other data resources on the data processing platform, the execution environment comprising one or more specifications for running the committed code on the data processing platform;
   receiving a request message including the identifier;
   in response to receiving the request message, determining an available execution environment suitable for the one or more specifications of the execution environment mapped by the identifier; and
   preparing at least one configuration parameter of the available execution environment for executing the committed code.

2. The method of claim 1, wherein determining the available execution environment comprises selecting the available execution environment from a pool comprising a plurality of pre-prepared execution environments.

3. The method of claim 1, wherein determining the available execution environment comprises preparing a new execution environment in response to failing to select the available execution environment from a pool comprising a plurality of pre-prepared execution environments.

4. The method of claim 1, wherein the committed code is pre-fetched in the available execution environment.

5. The method of claim 1, wherein the at least one configuration parameter includes at least one of: code artefacts, data libraries, and access permissions.

6. The method of claim 1, wherein the one or more specifications for running the committed code are determined at least partially explicitly from a configuration file in the committed code.

7. The method of claim 1, wherein the one or more specifications for running the committed code are determined at least partially implicitly from the committed code.

8. The method of claim 1, wherein the one or more specifications for running the committed code are determined at least partially implicitly according to file extensions of files in the committed code.

9. The method of claim 1, wherein the determined available execution environment is isolated from the other data resources such that all requests made to, or received from, said other data resources are made via a proxy.

10. The method of claim 9, wherein the proxy passes the requests when the other data resources on the data processing platform are pre-authorized.

11. One or more computer-readable non-transitory data storage media storing one or more sequences of program instructions which, when executed by one or more processors of a data processing apparatus, causes the data processing apparatus to perform a method of creating and executing computer-readable code for interaction with one or more data resources on a data processing platform, the method comprising:
   committing user-entered computer-readable code to a data repository that is isolated from other data resources on the data processing platform, the committed code conforming to at least a minimal set of requirements of the data processing platform;

in response to committing the user-entered computer-readable code, creating an identifier mapping the committed code to an execution environment that is isolated from the other data resources on the data processing platform, the execution environment comprising one or more specifications for running the committed code on the data processing platform;

receiving a request message including the identifier;

in response to receiving the request message, determining an available execution environment suitable for the one or more specifications of the execution environment mapped by the identifier; and preparing at least one configuration parameter of the available execution environment for executing the committed code.

12. The one or more non-transitory data storage media of claim 11, wherein determining the available execution environment comprises selecting the available execution environment from a pool comprising a plurality of pre-prepared execution environments.

13. The one or more non-transitory data storage media of claim 11, wherein determining the available execution environment comprises preparing a new execution environment in response to failing to select the available execution environment from a pool comprising a plurality of pre-prepared execution environments.

14. The one or more non-transitory data storage media of claim 11, wherein the committed code is pre-fetched in the available execution environment.

15. The one or more non-transitory data storage media of claim 11, wherein the at least one configuration parameter includes at least one of: code artefacts, data libraries, and access permissions.

16. The one or more non-transitory data storage media of claim 11, wherein the one or more specifications for running the committed code are determined at least partially explicitly from a configuration file in the committed code.

17. The one or more non-transitory data storage media of claim 11, wherein the one or more specifications for running the committed code are determined at least partially implicitly from the committed code.

18. The one or more non-transitory data storage media of claim 11, wherein the one or more specifications for running the committed code are determined at least partially implicitly according to file extensions of files in the committed code.

19. The one or more non-transitory data storage media of claim 11, wherein the determined available execution environment is isolated from the other data resources such that all requests made to, or received from, said other data resources are made via a proxy.

20. The one or more non-transitory data storage media of claim 19, wherein the proxy passes the requests when the other data resources on the data processing platform are pre-authorized.

* * * * *